May 7, 1946.   W. D. HALL   2,399,673
CONTROL SYSTEM
Filed June 29, 1943   3 Sheets-Sheet 1

INVENTOR.
William D. Hall.

May 7, 1946.　　　　W. D. HALL　　　　2,399,673
CONTROL SYSTEM
Filed June 29, 1943　　　　3 Sheets-Sheet 3

INVENTOR
William D. Hall.

Patented May 7, 1946

2,399,673

UNITED STATES PATENT OFFICE 2,399,673

CONTROL SYSTEM

William D. Hall, Elkins, W. Va., assignor to
Nathan I. Hall, Madison, N. J.

Application June 29, 1943, Serial No. 492,737

21 Claims. (Cl. 158—28)

This invention relates to control systems and more particularly to means for igniting, burning, regulating the combustion of, and otherwise controlling combustion of fuel. The primary object of this invention resides in the provision of a system for igniting and/or regulating a fuel burner, that is simple, compact, and low in cost as compared with systems of the prior art. Other objects include the provision of means for causing the control functions of the system to be performed at a rapid rate and in a safe manner. Still other objects include the provision of means whereby the probability of ignition of fuel is substantially greater than achieved by other inventors in the past.

As a general rule, a combustion control system for an oil, gas, or gasoline burner has the following main functions demanded of it (a) to effect ignition of the fuel and (b) to control the delivery of that fuel in such a manner that it will be burned without violent explosions or other dangerous conditions. To achieve these two main functions the prior art control systems as proposed by others have been quite complicated and expensive, and moreover as a further general rule they employed external control boxes containing numerous external control parts such as relays, transformers, and the like, which are unnecessary with my preferred form of invention. While such parts can be applied to my control system and still fall within the broadest aspects of my invention, it will be clear that the novel mode of operation and structural construction is such that these parts are not absolutely necessary as they are in many prior art devices.

Briefly speaking, the preferred form of my invention includes an electrical igniter, or other heater, which is heated initially. A thermostatic element is heated by that igniter or other heater, and carries a first contact which engages a second contact to close a circuit to the fuel valve to open the latter and admit fuel. Combustion causes further flexure of the thermostatic element, and a slip-friction member is employed so that this further flexure results in a slipping movement. The slip-friction member may be the said first contact which may be arranged to slip with respect to the bimetallic thermostatic element, or it may be the second contact which is arranged to slip with respect to the stationary support for the whole system, or it may be the thermostatic element itself which is arranged to slip with respect to the stationary support for the whole system. In any event, contacts in the igniter circuit are arranged such that when the two members relative to which slipping occurs do slip, the circuit to the igniter is broken. The foregoing brief explanation is not intended to be particularly comprehensive, and certain variations are hereinafter described. The principle of my invention is, however, broader than the details of the particular systems shown, which are merely illustrative, and accordingly the claims are worded broadly to cover the principle generically.

This application is a continuation-in-part of my prior copending application, Serial Number 347,951, filed July 27, 1940, entitled Control systems. Figures 1, 2, 3 and 4 of this application and the description of these figures are shown and found in substance, in the said prior copending case.

Figure 1:
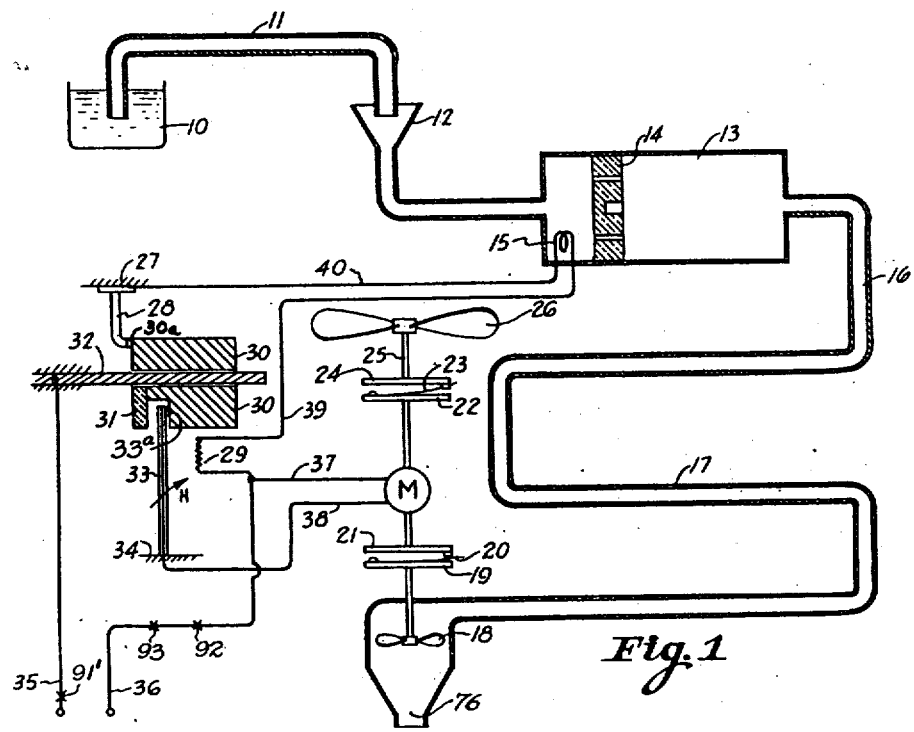
Figure 1 is a schematic diagram of the parts making up one form of this invention with certain parts of the fuel flow path and combustion control parts illustrated in section.
Figure 2:
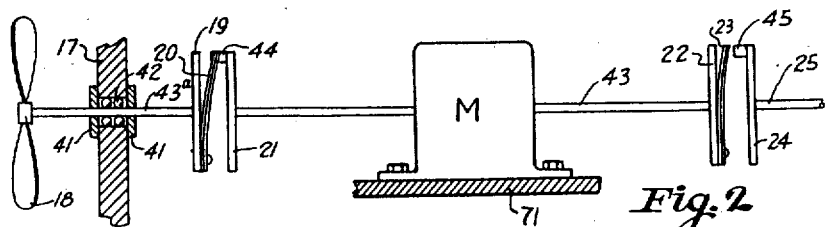
Figure 2 illustrates certain thermostatic clutches used with the burner of Figure 1.

Since the details of the burner, fan and fuel pump, are of little importance to an understanding of the principle claimed in this application, I will merely mention the function of the various parts making up those elements, and refer those skilled in the art to my prior application in event they desire complete descriptions of those parts. In Figures 1 and 2, a fuel tank 10, has a fuel feed line 11, a mixer 12, combustion chamber 13, ceramic heat retaining re-igniter 14, igniter of the hot-wire type 15, radiator 16, 17, exhaust pump 18, and exhaust outlet 76. An electric motor M drives a shaft 43 which in turn drives the discs 21 and 22 of two thermostatic clutches respectively. These thermostatic clutches respectively include bimetallic strips 20 and 23, and secondary discs 19 and 24 which respectively are attached to shafts 43ª and 25. These latter shafts respectively drive pump 18 and circulating fan 26. Ears 44 and 45 on discs 21 and 24 provide means for engagement of the bimetallic strips 20 and 23 respectively. When the temperature of the system is very low, bimetallic strip 23 is out of engagement with ear 45, but bends to make such engagement when the system gets hot enough to warrant air being circulated to the place to be heated. Bimetallic strip 20 is normally in engagement with ear 44, but flexes and disengages that ear to thereby stop the pump 18 upon an excess temperature. Ball bearings 42, and plates 41 enable smooth operation of pump 18 without leakage of fumes.

While, as shown, the system is employed for burning gasoline, it is equally applicable so far as the inventions claimed herein are concerned, if oil, or natural gas, or any other fuel, is supplied, to either a burner as shown, an open air burner, or any other kind of burner. In the particular burner shown, the pump 18 is employed to pump out the exhaust gasses at such a high rate that fuel is drawn in the fuel feed line. The pump 18 may be located in the fuel feed line 11, or may be replaced by a solenoid-operated gas valve when gas is burned, such gas valve being represented in Figure 4 for example as M. The part M, may therefore be a motor-driven pump, or a gas valve, or other equivalent fuel flow controller.

Passing now from the parts, described above, to the heart of the invention, which is claimed, I refer to Figure 1 which employs a single bimetallic element 33 with a contact 33a carried by the upper end thereof. The lower end of the bimetallic strip 33 is rigidly supported by a fixture 34 which may be part of some fixed piece of apparatus such as a housing. In general the location of the strip 33 with respect to the radiator 17 is such that it responds to heat from that radiator, and the distance of separation is not important so long as substantial heat is received by strip 33, although if the strip is placed immediately adjacent the radiator the system is more compact than it might otherwise be. The control system has two other parts that are rigidly supported solely at one end. The square rod 32 is rigidly fixed at its left end, and is solid stainless steel. The contact arm 28 is rigid and is fixed at its upper end 27. It is understood, therefore, that the three rigidly fixed parts, namely 27, 32, and 34 have a fixed relationship to each other. The only movable parts are (a) the free or outer end of strip 33 which moves only when the temperature of strip 33 changes, and (b) the movable block 30. Block 30 is rather heavy and has a hole in it slightly larger than the size of rod 32. It also has an insulating section 31 of suitable insulating material such as porcelain or steatite. Other than for the insulating piece 31, the block 30, as well as rod 32, is made of stainless steel or other material suitable to withstand the necessary temperatures without rusting. Block 30 carries a contact point 30a which is arranged to engage or disengage contact arm 28 depending on the motion of block 30. No springs or other force producing devices, except strip 33, act upon block 30 and therefore friction between the block and rod 32 tends to cause the block 30 to remain in any position to which it is pushed by strip 33. Initially, when the heater is in its "off" position and the system is cool, the strip 33 is curved slightly and the free end is in engagement with insulating block 31. This action maintains contact between 28 and 30a. The strip 33 is arranged to receive heat not only from radiator 17, but from resistor 29 which is rather closely associated with strip 33.

The operation of the combustion control system of Figure 1 is as follows: When a potential is applied across wires 35 and 36 such as by the mere closing of a switch, time clock, or room thermostat (any of which may be connected at 91') current flows through the following path: 35, 32, 30, 30a, 28, 40, 15, 29, 36. Since at this stage of the operation contact 33a is out of contact with block 30, no current flows to the motor M. However, after a short time heat from resistor 29 flexes strip 33 to such an extent that contact 33a moves into contact with block 30 and this establishes a second current path in addition to the first; the second path being: 35, 32, 30, 33a, 33, 34, 38, M, 37, 36. Since the block 30 is rather heavy it will not begin to move instantly but the strip 33 must be heated considerably before it has sufficient force to overcome the static friction of this block and move the same enough to break the circuit at 28—30a. Hence the igniter is energized for a few seconds or more after fuel begins to flow. If the flame satisfactorily ignites, the high heat of the flame will supply ample force to break contacts 28—30a quickly and therefore the igniter wire 15 and resistor 29 are deenergized but of course contact 33a continues to press against block 30 and maintain the motor circuit closed. As the burner continues to heat the strip 33 the latter will continue to move block 30 toward the right due to pressure exerted on block 30 by the contact 33a. Should the flame then for any reason become extinguished, the strip 33 will begin to cool and reverse its direction of motion. Its contact 33a will leave engagement with block 30 within a short interval of time. I proportion the block 30 as to weight, the strip 33 as to thickness, and the ceramic re-igniter as to mass, so that the ceramic re-igniter will remain sufficiently hot to ignite the fuel even after strip 33 has broken its circuit at 33a. Hence should the flame become extinguished it would not be possible to start the motor unless the re-igniter 14, or the main igniter 15, is sufficiently hot to ignite the fuel. For example, if the re-igniter 14 is massive enough to relight the flame after the latter has been extinguished 30 seconds, I proportion the weight of block 30 and the thickness as well as the width of strip 33 so that upon cessation of combustion the circuit at 30—33a is broken in a time substantially less than 30 seconds. Should the fuel fail to ignite throughout a period of more than thirty seconds, strip 33 will after perhaps a minute or so engage insulating piece 31. Still further cooling of the heater will take place and strip 33 will push the block 30 to the left due to its contact with 31 until finally, after several minutes, contact 30a re-engages contact 28 so that the igniter circuit is reestablished via the circuit 35—32—30—30a—28—27—40—15—29—36. The motor M at this time is deenergized, but as heater 29 again raises the temperature of 33, contact at 33a—30 is again made with a consequent restarting of the motor and reestablishing flow of fuel which will be relighted by the hot igniter 15.

The above description of operation presumed that the fuel supply was properly ignited by the igniter 15 and that fuel then continued to burn for at least a short while. I will now describe the operation of my system under the abnormal condition (but a condition that does sometimes occur) of failure in the igniter 15 to actually ignite the fuel on the first effort. Assume that the apparatus is in its "off" position with strip 33 solidly against the insulating piece 31. Hence contact is made at 28—30a but broken at 30—33a. Upon control switch 91' being closed, current begins to flow through the resistor 29 as heretofore specified and this causes strip 33 to flex to the position shown in Figure 1. The motor M now starts and fuel passes to the combustion chamber. If the fuel fails to ignite, heater 29 will after an additional time cause strip 33 to flex enough to push block 30 away from contact 28 thus breaking the igniter circuit. This action deenergizes resistor 29 and soon thereafter the strip 33 begins to cool. Such cooling breaks the motor circuit at 33a—30 and the strip 33 will continue to cool until it engages 31 and then finally forces block 30 to the left to reclose the igniter circuit at 28—30a. The resistor 29 is again heated and again causes flexure of strip 33 to the right until the motor circuit is again made at 33a—30. If my circuit is carefully studied, in view of the above explanation, it will become apparent that the control system will repeatedly energize the igniter 15 and motor M. The sequence will be as follows: "igniter on," "fuel on," "attempt at ignition," "igniter off," "fuel off," "time space to permit unburnt gas to escape," "igniter on," "fuel on," "attempt at ignition," "igniter off," "fuel off," "time space to permit unburnt gas to escape," "igniter on," etc., indefinitely or until stopped by a suitable safety cut-out (not shown) such as that in casing 13 of my prior Patent 2,159,658. Such a safety switch may be located at point 93 in Figure 1.

So far as the combustion control systems illustrated herein are concerned, the motor M may be a solenoid valve located in the path of fuel as in the case of my said prior Patent 2,159,658, provided some means is provided to force the gases through the system.

In addition to other safety precautions mentioned in this patent, overheating thermostats such as 92, may be connected in wire 36. Such thermostats may be located near any part of the system that is liable to become overheated, for example the fuel tank 10.

Figure 3:
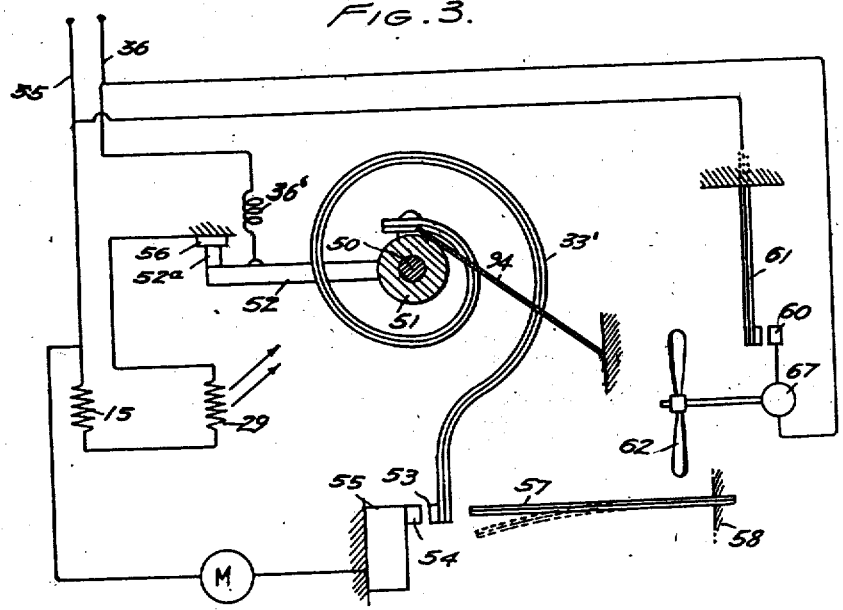
Figure 3 illustrates another form of combustion control system claimed in this application.

While the system of Figure 3 is very effective for many purposes, it is particularly useful in systems subjected to considerable jarring, and it uses a lost-motion or slip-friction switch having rotary motion instead of linear motion. In Figure 3, a central rigidly supported shaft 50 is composed of stainless steel. An outer sleeve has a diameter slightly larger than shaft 50 and is arranged to freely slip around the shaft 50. A spring 94 bears downwardly on sleeve 51 and places considerable contact pressure between the sleeve 51 and the shaft 50. Spring 94 does not engage either the arm 52 or bimetal 33' as this spring bears against a portion of sleeve 51 which is in front of the strip 33' and sleeve-arm 52. Spring 94 may be omitted from the construction if desired with good operation, since the sleeve 51 and rod 50 may be provided with a proper amount of friction without the spring 94. The strip 33', I have found, may be rather heavy and one specimen device has a strip 33' approximately one-half inch wide, 0.05 inch thick, and of five inches developed length.

The coiled bimetallic element 33' is composed preferably of the highest quality heat withstanding bimetal and has an inner end rigidly bolted or welded to the sleeve 51. The outer end of this bimetallic strip carries a contact point 53. A stationary contact point 54 supported by the rigid block 55 cooperates with contact 53. The sleeve 51 carries an arm 52 which arm is relatively light as compared to the total weight of the sleeve 51. This relationship may be effected by making the sleeve much longer in a direction parallel to the shaft than the arm 52 in such direction. The arm 52 carries a contact 52a. The stationary contact point 56 is arranged to cooperate with movable contact 52a. Another bimetallic strip 57 may be employed, although this strip can satisfactorily be composed of an ordinary rigid metal as under normal conditions the operation of the system does not depend upon flexure of this strip. The strip 57 is composed of a thick piece of bimetal and deflects to the dotted line position at a temperature of about −50° F. At normal temperatures it is straight or at least curved downwardly only slightly. The reason for flexure of this strip 57 is that should the temperature go to say −50° F. during a cold winter month and at a time when the heating system is not in operation, the bimetal strip 33' will not be overstressed but the strip 57 will move from the path of 33' and the free end 53 thereof can rotate counterclockwise without striking any obstruction. If a strip 57 of rigid ordinary metal is used, it is possible for the ambient temperature to fall so low, −50° F. for example, that strip 33' will strike strip 57 and upon further fall in temperature internally stress itself to such a large extent as to take on permanent deformation. Since it is necessary for the ambient temperature to fall approximately 150° F. after the end of 53 strikes 57 before the strip 33 would be permanently stressed in event strip 57 was of rigid metal, the outer end of strip 33' will touch 57 at room temperatures and exert a slight tension against 57. This small tension will not permanently deform the resilient bimetallic strip 33. Contacts 52a, 56 are therefore closed at ordinary room temperatures, but contacts 53—54 open. The wire 36' is a flexible lead and fastens to arm 52; however, the wire 36' does not have any spring action or in any way mechanically exert a force directly upon arm 52; it merely connects electrically thereto.

Upon applying potential to wires 35, 36 while the apparatus is in the initial off position, only one current path exists, namely: 35—15—29—56—52a—36'. Heat from resistor 29 affects strip 33' and causes the same to tend to coil up. This will not break the circuit at 52a—56 at this time inasmuch as the friction between 50 and 51 is appreciable and will tend to hold the position shown until a definite torque is exerted on the sleeve 51 by the bimetallic strip 33'. The contact 53 moves through midair until it strikes contact point 54. During this time, prior to striking this contact point, it is clear that strip 33' cannot exert a torque on the sleeve 51. Finally as resistor 29 gets strip 33' hotter and hotter the contact 53 moves into engagement with stationary contact 54 and this engagement closes the motor circuit via the following current path: 45—M—55—54—53—33'—51—52—36'. For a time after this, both the motor M and the igniter 15 operate simultaneously. The time during which the two operate simultaneously is governed by the tension in spring 94. If this spring causes considerable tension between sleeve 51 and rod 50, the igniter 15 and the motor M will operate simultaneously for a long time. Another method of obtaining a long simultaneous operation of those parts is to have resistor 29 just powerful enough to barely heat strip 33' to the point where the circuit between 52a and 56 is broken. Preferably, the tension and/or heating is so arranged so that the motor M and igniter 15 operate simultaneously for the time deemed best for the particular style of burner to which the invention is applied, which in general is about 15 to 30 seconds. As just stated, the igniter 15 and motor M operate simultaneously for a while. If the fuel ignites, heat will be supplied to strip 33' from the combustion chamber and this strip will continue to flex. Since contact 53 has now struck a rigid obstruction 54 further flexure of the strip will result in rotation of the sleeve 51 against the friction of stationary shaft 50. Consequently arm 52 will be rotated counterclockwise and contact between 52a and 56 broken. This deenergizes the igniter 15 and resistor 29. Further heating will continue to rotate arm 52 counterclockwise and contacts 53 and 54 will remain in engagement. If the heater 17 becomes rather hot and then the flow of fuel ceases, the friction between 50 and 51 will be sufficient to hold arm 52 in the position it had when the flame went out. Cooling of 33' will therefore result first in a counterclockwise rotation of contact point 53, and a quick disengagement of 53 and 54. However, such rotation is limited as the free end of strip 33' strikes 57 after rotating clockwise a fraction of an inch. As soon as strip 33' strikes 57 the subsequent flexure of strip 33 will result in a clockwise rotation of arm 52 with slippage taking place at 50, 51. Strip 57 will finally return to a straight position from its high temperature condition and as strip 33' approaches room temperature its contacts 52a—56 will be reclosed. This closure will reclose the igniter circuit 15, reenergize resistor 29, reheat 33' which strip will begin to rotate 53 clockwise without any slippage taking place at 50—51, reclose 53—54, restart the motor, and subsequently reopen the circuit to the igniter at 52a—56. Hence an attempt at reignition will be made. Should this attempt to relight the fuel fail, additional attempts will automatically be made. Unless a thermal cutout such as that contemplated by reference 13 of my prior Patent 2,159,658, is placed in lead line 35, the igniter and fuel motor will operate intermittently and make repeated attempts indefinitely to ignite the fuel. If such a cut-out is used, the number of attempts will be limited to several attempts.

Briefly speaking, the sequence of operation under practically all conditions is the same for Figure 3 as for Figure 1. However, Figure 3 shows an additional optional feature now to be described in this paragraph. After being placed into operation, when the heating system reaches a predetermined temperature, the bimetallic switch 61 closes to 60 starting an added fan motor 67 that is also energized from wires 35 and 36. This fan motor 67 has a fan totally independent of motor M and may replace fan 26 if desired or it may be used together with fan 26. However, the two normally need not both be used. The cooling effects of fan 62 are such as to tend to hold bimetallic strip 33' at a predetermined maximum temperature and this may be accomplished if fan 62 is a small fan that blows cold air in small quantity over strip 33' if the latter exceeds the said maximum temperature. As pointed out in my aforesaid copending application S. N. 347,951, the operation of the main fan 26 will hold the system at a predetermined maximum temperature under most circumstances within the meaning as used herein but by use of two fans there is added refinement and more perfect operation. By holding the strip 33' at a predetermined maximum temperature, or in other words by normally limiting the maximum temperature, the system acts more quickly than it otherwise would in relighting the burner after the flame goes out.

Figure 4:
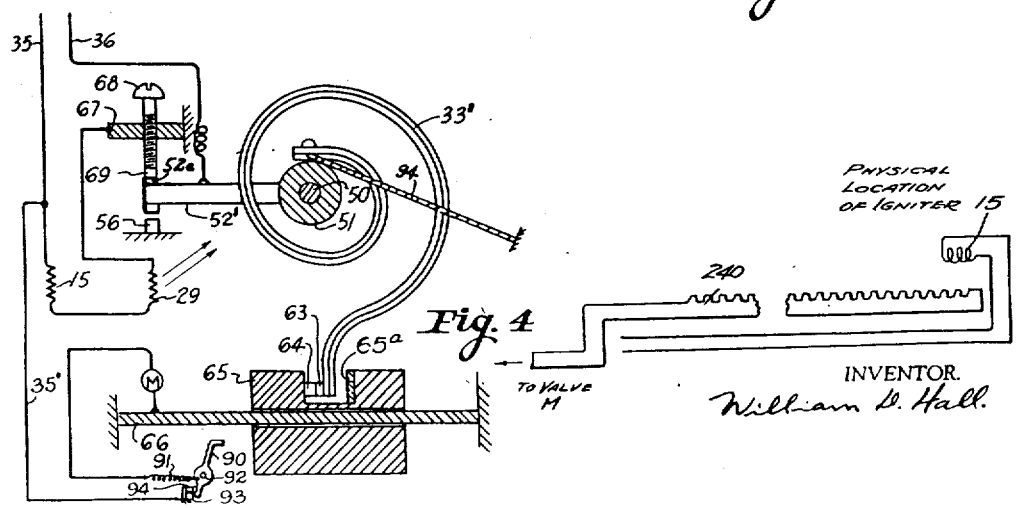
Figure 4 is a drawing of still another form of combustion control system claimed herein.

The control system of Figure 4 will now be described in detail. The apparatus of Figure 4 is shown in section in the drawings and has a shaft 50, said shaft being fixed at the rear end thereof. Sleeve 51 is arranged to slip over the shaft 50 as the sleeve has a very slightly larger diameter than the shaft. The spring 94 is located in front of bimetallic strip 33' and presses firmly on sleeve 51 (which obviously extends well in front of strip 33' as sleeve 51 is sectioned whereas the strip 33' is shown in full view). The arm 52' is fastened electrically and mechanically to sleeve 51 and extends behind bimetallic strip 33' and carries a contact 52a. The bimetallic strip is arranged to coil up when heated and to uncoil when cooled. A stationary support 67 supports screw 68, the latter carrying on its tip end a contact point 69. Another stationary contact, not electrically connected, is provided at 56. A stationary square bar 66 supports a large movable block 65. A contact point 64 is fastened to the block 65; moreover a piece of electrical insulation extends across block 65 at 65a. An electrical hot-wire igniter 15 has a resistor 29 in series with it. Resistor 29 is arranged to heat strip 33' when energized.

In the off position, arm 52' is initially against 69 and strip 33' has its lower end against 65a. Hence, contacts 63 and 64 are disengaged. When power is applied at 35, 36, current flows as follows: 35—15—29—67—69—52a—52—36. Hence resistor 29 becomes heated and causes strip 33' to coil up until contact 63 engages 64. This causes motor (or valve) M to be energized via the following circuit: 36—52—33'—63—64—65—66—M—91—93—94—35. For an interval the motor M and igniter 15 will simultaneously operate thus igniting the fuel. Further heating of 33' due to heat from the flame (or 29) will result in further coiling up of 33'. Since block 65 is very heavy, slippage will take place at 50—51 before 65 will slip. Hence contacts 69—52a will be broken and arm 52 will move into engagement with 56. Since 56 is stationary, the slippage will now take place at 65—66 and as the burner continues to heat, the block will slip along 66 with 63 and 64 maintaining contact. An arm 90 is pivoted near its center at 92. It carries on its lower end a contact point 93. A complementary stationary contact point 94 connects to wire 35. A spring 91 tends to produce clockwise motion of the arm and thereby normally maintain the contacts 93 and 94 together. When overheating takes place block 65 moves to the left, engages arm 90, rotates the latter, and breaks the motor circuit at 93, 94. If spring 91 is omitted the system cannot be restarted without manually resetting arm 90. With spring 91 connected, the system will restart automatically when strip 33' cools.

Should the burner satisfactorily ignite and burn for a long while, then the flame be accidentally extinguished, 63 will immediately drop away from 64 and rotate counterclockwise until it comes into contact with 65a. Strip 33' will tend to further uncoil and reclose 52a—69 thus reenergizing the igniter circuit 15. Heater 29 will reheat 33' thus reclosing 63 and 64 restarting the motor M. Should the flame fail to relight, the heat from 29 will tend to further coil up 33' so as to break the circuit at 52a—69. This will cause 33' to cool and move into engagement with 65a. Further cooling will take place thus reclosing 52a—69 and this will reheat 29 and 33' thereby making another attempt at ignition. As a result, repeated ignition attempts are made. The same holds true in event an original attempt at ignition fails; that is several attempts to ignite will be made if the first effort fails. Should it be deemed desirable, suitable safety switches such as overheating thermostats, time clocks, or switches like in casing 13 of my said prior Patent 2,159,658, may be placed in line 36.

The best mode of utilizing the control system on an elongated gas burner is also shown in Figure 4. An elongated burner having a large number of burner ports is often designed so it will not ignite clear across the burner all the time. Hence, the burner B has its igniter 15 located at the extreme right end of the burner whereas the bimetallic strip 33' is located at the extreme left end. Hence, if for any reason, the igniter ignites the gas at only a few ports at the extreme right end, the automatic system at the left end, including strip 33', will not be heated by the flame and that mechanism will operate in the manner it would in event there was no ignition at all, namely, "igniter off," "fuel off," "time to permit unburnt gas to escape," "igniter on," "fuel on," "attempt at ignition second time," etc. Hence subsequent attempts at ignition will be made, and if they repeatedly fail to ignite the gas clear across the burner, and if a safety switch is used in line 35, the apparatus will effect a complete shut down.

Figure 5:
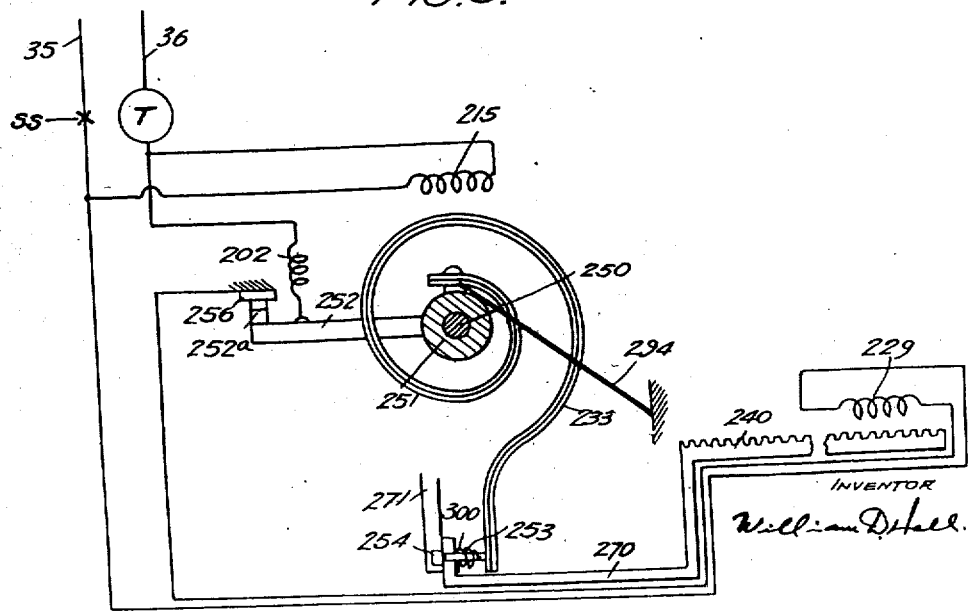
Figure 5 illustrates still another form of combustion control system claimed herein.

In Figure 5 there is shown an arrangement whereby a mechanical valve may be operated by my novel control system instead of the motor or valve hereinbefore previously illustrated. The system illustrates an elongated gas burner with a large number of burner ports 240, with a hot wire igniter or other igniter 229 at the right end thereof. A pipe 270 has a valve 253 therein which has a stopper 254 that under normal conditions presses firmly against the right face of pipe 271 and thereby holds the valve closed. A shaft 250 has a slipping sleeve 251 and a spring 294 cooperating with it as has been previously described in connection with Figures 3 and 4. An arm 252 secured to sleeve 251 has a contact point 252a which normally presses firmly against the stationary contact 256. Current is applied at wires 35 and 36 to room thermostat T and safety switch SS, the latter which may be built like is shown in casing 13 of my prior Patent 2,159,658. A heating resistor 215 is located close to strip 233 for the purpose of heating the latter. A flexible wire 202 leads current to arm 252.

The operation of Figure 5 is described as follows. When thermostat T calls for heat, current immediately flows through heater 215, and simultaneously it flows via the following path: 36—202—252—256—229—SS—35. The igniter is therefore heated. The heat from heater 215 heats bimetallic strip 233 which thereupon moves stopper 254 away from the opening in pipe 271 and admits flow of gas to the elongated burner 240. The igniter 229 will normally ignite this gas and the same will spread across the burner and provide further heating of strip 233. As strip 233 becomes hotter, the stopper 254 will move to the left as far as it can whereupon further tension in strip 233 will result in counterclockwise rotation of arm 252 and breakage of the igniter circuit. The strip 233 will continue to be heated under the influence of two heat sources namely heater 215 and the flame. As strip 233 becomes hotter, it will move arm 252 further counterclockwise, by overcoming the friction between sleeve 251 and rod 250 and spring 294. Should the thermostat T cease calling for heat by breaking its circuit, the heater 215 will be immediately deenergized. Since strip 233 is heated by the flame and heater 215, and the latter source of heat has been cut off, the strip 233 will cool off somewhat, and this will result in no change in position of arm 252 at first but will cause the valve 253 and stopper 254 to move to the right. Movement of 254 to the right will either close the valve completely or close it partially. If it only closes it partially, the flame will be reduced in size and this will effect further cooling of 233 due to heat generation falling off. In any event the flame will go out, and once stopper 254 has been properly seated the strip 233 will cool further until finally contact at 252a—256 is reclosed. The apparatus is then ready to be started again upon further call for heat from the thermostat T.

Other operations of the system of Figure 5 include closure of the valve upon flame failure. If the burner should ignite satisfactorily and then continue in operation indefinitely or for a long period, whereupon the gas supply should become exhausted, the first thing that will happen is a closure of the valve and subsequent reclosure of the igniter contacts 252a—256. If the gas supply is renewed in the meanswhile and begins to exert pressure in pipe 271, it cannot flow until a substantial time has elapsed from the time it orginally stopped, and not until the igniter has again been energized. When the igniter is reenergized by thermostat T the heater 215 will heat strip 233 and reopen the valve.

Should the apparatus be started from a normal off position and the valve 253 open in the normal way but the gas fail to ignite, the long current drain that will ensue due to that consumed by igniter 229 will cause safety switch SS to shut down the circuit and permit heater 215 to cool. This cooling action will reclose the valve and a permanent shut down accomplished. The safety switch SS is so adjusted that the current drawn by heater 215 alone is insufficient to operate SS, but combined extended current drain of 215 and 229 will cause switch SS to operate.

In event the gas is ignited by igniter 229 of Figure 5, but fails to spread across the burner, the apparatus will shut down as has been said.

Figure 6:
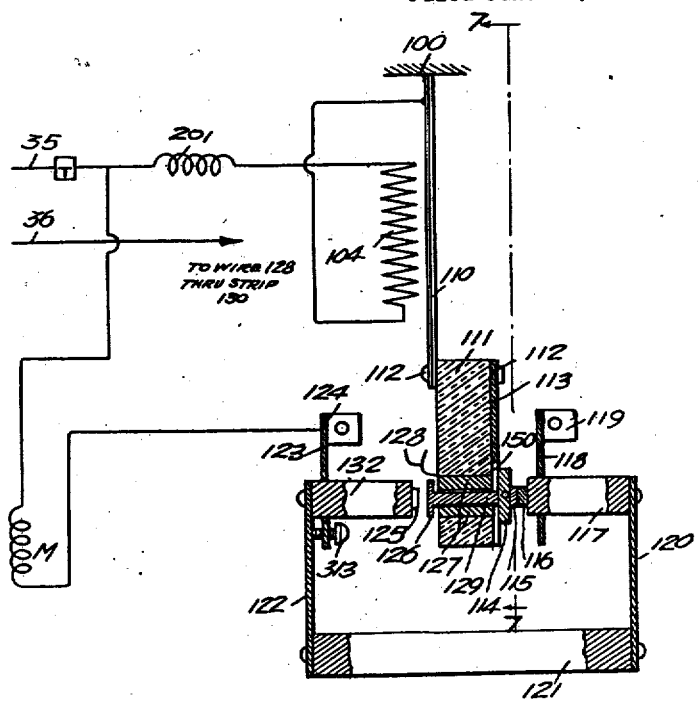
Figure 6 illustrates still another form of combustion control system claimed herein.
Figure 7:
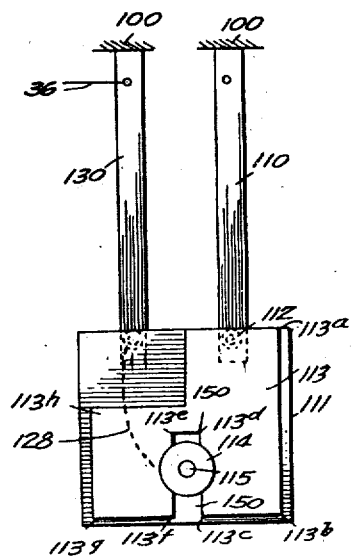
Figure 7 is a sectional view of Figure 6 taken along line 6—6.

Passing now to Figures 6 and 7 which illustrate still another form of my invention, there is provided a supporting insulator 100 from which two bimetallic strips 110 and 130 are suspended. These bimetallic strips support an insulating block 111 which is substantially square when viewed as in Figure 7 and which is fairly thick as shown in Figure 6. Mounted on insulating block 111 there is a metal plate 113. To show the shape of plate 113, I have designated the various corners of it with reference numbers 113a, 113b, 113c, 113d, 113e, 113f, 113g and 113h respectively. It is clear therefore that this metal plate has a slot in it, this slot being designated as 150. Rigidly mounted within insulating block 111 is the metal cylinder 127. Cylinder 127 has a central hole therethrough which is slightly larger than the metal rod 129. The metal rod 129 has a diameter smaller than the width of the slot 150 so this rod never touches plate 113, but the rod 129 has a flange 114 on its right end which flange is of larger diameter than the width of slot 150 and consequently the face of this flange will from time to time touch plate 113 as will hereinafter appear. On the right face of flange 114, is mounted contact point 115. On the left end of rod 129 is mounted a contact point 126. The rod 129 is longer than the combined thickness of block 111 and plate 113 for a purpose that will appear. A wire 128 is connected to bimetallic strip 130 which in turn is connected to one side of the 110 volt line, is connected to metal cylinder 127, and hence to rod 129. The rod 129 is therefore at all times at the potential of one side of the 110 volt A. C. line 36.

There is another set of parts now to be described that are mounted independently from the parts already described, but the parts all cooperate. Two brackets 119 and 124 are rigidly mounted and always remain in the same relative position with respect to support 100. Brackets 19 and 24 respectively have downwardly extended plates 118 and 123. Each of these plates 118 and 123 have holes in them slightly larger than the rods 117 and 132. Hence rods 117 and 132 may freely move through the plates 118 and 123 when pushed therethrough by movement of block 111 as hereinafter will be mentioned. There are no springs or other forces acting on rods 117 and 132 except as described herein. Rigidly attached to the rods 117 and 132 respectively are found strips 120 and 122 which rigidly support the mass or weight 121 of insulating material and which is rather heavy. A set screw 313 is located in strip 123 and sets the rightmost position that the rigid carriage comprising 132, 122, 121, 120, and 117 may take. The bimetallic strips 110 and 130 are so placed in tension that they assume the position shown and in the normal off position press the block 111 toward the right and thereby maintains plate 114 pressing tightly against plate 113, and presses contacts 115 and 116 tightly together. These latter contacts carry no current, but do initially make mechanical contact under pressure.

The electrical circuit of the apparatus of Figure 6 includes a pair of wires 35 and 36 for connection to the source of current, a hot-wire or other igniter 201, a heater 104 arranged nearby strips 110 and 130, and a motor M or gas valve.

When the room thermostat T calls for heat, the initial current path may be traced as follows: 35—201—104—110—112—113—114—129—127—128—130—36. Since the motor M is connected to 124 at one side, no current flows in the motor at present, hence the motor does not start at this time, but the igniter 201 is fully energized. The heater 104 soon heats strips 110 and 130 until it causes them to move carrying block 111 to the left. The arrangement 117—120—121—122—132 remains fixed for the time being, however. As block 111 moves to the left it is obvious that the igniter circuit remains closed for the time being since plate 114 remains in contact with plate 113 as block 111 moves. After a short movement of block 111, contact 126 meets contact 125 and closes the circuit to the motor or valve M. Current flows then in two paths, one similar to that described at the beginning of this paragraph and another as follows: 35—T—M—124—123—132—125—126—129—127—128—130—36. Hence the valve M and igniter 201 remain energized simultaneously for a short while, long enough for the fuel to ignite. Ignition of the fuel causes the bimetallic strips 110 and 130 to thereupon begin to move very rapidly and the further motion carries block 111 to the left and the pressure set up between contacts 125 and 126 causes rod 129 to move to the right relative to block 111. Strictly speaking, the rod 129 remains stationary for a short while during which interval the block 111 and plate 113 move to the left, and this causes separation of plate 113 and flange 114, thereby deenergizing the current circuit to the igniter. When the block 111 has moved to the left far enough that the left end of cylinder 127 meets the right face of contact point 126, any further movement of the block 111 results in pushing the whole assembly (except 118, 119, 123 and 124) to the left. During this process the rods 132 and 117 slip through strips 123 and 118 respectively to a degree depending upon the temperature reached by 110 and 130.

After long and continued operation of the burner, should the flame go out, the bimetal strips 110, 130 would reverse their motion and contacts 125 and 126 would promptly within a few seconds separate thereby shutting down the motor M. Further cooling of strips 110 and 130 would promptly take place until contact points 115 and 116 engage and still further cooling will result in slippage between 127 and 129 while the plate 113 comes into contact with flange 114 thereby reenergizing the igniter 201 and heater 104. Heater 104 will again promptly heat strips 110 and 130 to again carry block 111 to the left and again close contacts 125, 126, thereby reclosing the motor circuit and establishing a flow of fuel at igniter 201, the latter being subsequently deenergized upon further expansion of strips 110 and 130.

Assuming that upon starting from an initial "off" condition, or starting after a flame failure, the gas fails to ignite, or fails to ignite clear across the burner (when the igniter 201 is located at one end of an elongated gas burner and the bimetals 110—130 at the other end) the following sequence will take place. With 114 touching plate 113, the block 111 will move to the left closing contacts 125 and 126 starting motor M. Even though the flame fails to ignite the heater 104 will prove to cause still further leftward swing of block 111 to break the circuit between plate 113 and flange 114 and thereby deenergize the igniter and heater 104. The heater 104 and bimetallic strips 110, 130 will thereupon promptly cool and carry block 111 to the right, breaking contacts 125, 126 thus shutting down the motor M. Further motion to the right will cause engagement of contacts 115 and 116, and reclosure of contact between plate 113 and flange 114. Thus the igniter and heater 104 will be reenergized and block 111 will travel to the left again until contact is again made at 125, 126 restarting the motor. Further motion to the left will break the igniter circuit thus causing motion to the right to break the motor circuit and reclose the igniter circuit. The sequence is as follows: "igniter on," "motor on," "igniter off," "motor off," "igniter on," "motor on," "igniter off," "motor off," "igniter on," "motor on," "igniter off," "motor off," "igniter on," etc. and this sequence will repeat indefinitely.

The advantages of the foregoing sequence are many. One advantage resides in improving the probability of the igniter 201 initially igniting the gas. After a long shut down, the mixture coming out of the burner is a poor one for ignition and it plays upon the igniter. Passage of this poor mixture across the igniter cools the igniter below igniting temperature and the fuel fails to ignite as long as the igniter wire is so cooled. If the fuel flow is stopped and later restarted, a better mixture is available and it strikes the igniter while the igniter is at full temperature and ignites; whereas if the fuel had continued to flow without interruption the flow of gas across the igniter would continue to keep the igniter cooled below ignition temperature.

Another advantage of the repeated on-and-off action in connection with an elongated burner, is that in such a burner the fuel does not always ignite at all ports clear across the burner. Design of burners necessitates spacing between the burner ports such that often the gas ignites at one end and begins to spread. The velocity of spreading tends to carry the flame along the burner to all port , but sometimes conditions are such that the flame only lights at one end of the burner and fails to spread, or spreads only half way. This means there is an escape of gas from the portion of the burner that receives no ignition. Once the burner has ignited only half way it rarely carries over to the other half unless it did so as part of one complete spreading action initially. By the on-and-off action of my control system, the repeated attempts soon cause the burner to shut down and start up enough times that it does spread clear across the burner.

An examination of Figure 4 shows that the block 65 moves proportionally to the temperature of the burner and thereby readily responds to overheating. The block 121 of Figure 6, the arm 52 of Figure 3, the arm 252 of Figure 5, and the block 30 of Figure 1 all likewise move in proportion to the temperature and excess movement of them likewise indicates overheating. Since the specifications are illustrative only and the showing of Figure 4 clearly teaches how overheating controls may be applied to these other blocks, no specific showing has been made in the other figures, particularly since the overheating feature is not an essential feature to all of the claims.

As further illustration of another feature not essential to all of the claims is the re-igniter 14. It is omitted from Figures 3 to 6 since its adaptation thereto is obvious, and is fully taught in connection with such systems by Figure 1.

Figures 4 and 5, inserted as illustrative, show the desirability of locating the igniter at the far end of the burner from the thermal element; likewise the use of the control system on a gasoline or oil burner is shown in Figure 1. In the light of these showings, it is clear that any of the systems could be applied to any of these, or any other form of burner.

While the several forms of this invention show as a preferred form valves and motors, which are equivalents so far as the claims are concerned, which completely stop the fuel when deenergized, in its broadest aspects the invention is not limited to complete stoppage of the fuel, since partial stoppage, i. e. reducing, will be of some advantage. For example in igniting the burner by the intermittent starting method a repeated reducing of fuel flow will have at least as important an advantage as complete stoppage; in fact in some respects it is of advantage over complete stoppage. Similarly in event the fuel supply should cease for a short interval, the apparatus will recycle that is stop the fuel flow until unburnt gas escapes and then reignite the gas. Reducing the flow will prevent as much escape as would otherwise occur.

One feature of Figures 1, 3 and 5 is that the valve is controlled due to reversals in temperature whereas the igniter is controlled at a low constant temperature. Hence if the fuel supply should cease to be combustible for a short interval (in excess of the heat-retaining time of ceramic 14) the quick action of the valve will be accomplished inasmuch as it is controlled by "reversal" in temperature; whereas time will be allowed for unburnt gas to escape before the igniter is reenergized. The same is true when ceramic 14 is omitted.

While Figures 1, 3, 4, and 6 have no means to bias the sliding action, Figure 5 has a small spring 300. This spring is desirable to assist in the construction of the valve as it eliminates the necessity of a joint between strip 233 and stem 253. Such spring exerts such a small bias on the sliding members 250, 251 that it may be neglected. It may be omitted entirely.

I claim to have invented:

1. In combination, a burner, an electrical heating device including a fuel igniting portion associated with said burner, and control means comprising; heat sensitive means responsive to the heat of combustion at said burner for controlling the feed of fuel to said burner and for controlling the energization of said heating device, said heat sensitive means including a thermal element responsive to heat from said heating device to move unrestrained and operate the control means to establish feed of fuel to said burner, means for initially energizing said heating device to initially effectuate heating of the thermal element and consequent establishment of fuel flow, and restraining means so located that after sufficient motion of said thermal element as to establish flow of fuel the thermal element will exert a force on said restraining means to thereby place stress in the thermal element; said control means including a slidable element associated with and subject to the stress set up in said thermal element due to engagement with said restraining means and including means whereby upon substantial stress in said thermal element the slidable means will slide and tend to relieve such stress, and means operated by the slidable element to control said heating device to deenergize the heating device when the slidable element first begins to slide under the initial stress placed in said thermal element due to engagement with said restraining means.

2. In a heating system, a burner, an igniter for the burner, fuel feed control means cooperating with the burner, thermal means located in the high temperature region near the burner, first and second control devices associated with and operated by said thermal means, the first control device including means whereby it is operatively controlled by changes in direction of response of the thermal means whereby to be operated by changes in the direction of response of the thermal means from a rising temperature to a falling temperature irrespective of the actual temperature level and the second control device including means operatively responsive to the actual temperature level of said thermal means, and means connected with said first control device to operate the fuel feed control means and admit fuel as long as the temperature of said thermal means is increasing and to promptly reduce fuel feed when the temperature of said thermal means reverses from a rising to a falling temperature irrespective of the actual temperature level, and means connected with and operated by the second control device to energize said igniter as long as the temperature of said thermal means is below a predetermined low burner temperature as acquired during the starting period of the heating system and to maintain said igniter deenergized as long as the temperature of said thermal means is above said predetermined low burner temperature; whereby in event the burner is operated continuously to a high temperature and the fuel supply ceases for a short interval to supply fuel to the heating system after which interval fuel is again made available to the heating system, the temperature in said region will drop slightly thus causing a reversal in the direction of response of said thermal means to thereby promptly stop feed of fuel by the fuel feed control means thus preventing or reducing continued escape of fuel and allowing a long interval to elapse during which unburnt fuel may escape before said igniter is reenergized by said second control device due to drop in temperature below said predetermined low temperature.

3. The heating system of claim 2 in which the first control device is so adjusted as not to admit fuel upon starting of the heating system unless at least a portion of said thermal means is heated, and means for initially supplying heat to said portion of said thermal means whereby to start the system.

4. The heating system of claim 2 in which said thermal means consists of a single expansible and contractible thermal element for mechanically driving said first and second control devices; the first control device being so adjusted as to prevent feed of fuel until heated initially, and an electrically operated heater controlled by said second control device for energizing and deenergizing the heater to supply heat to said thermal means concurrently with the heating of said igniter.

5. In a heating system, a main fuel burning heater, a fuel feed line to said heater, electrically operated means cooperating with said fuel feed line to control flow of fuel therethrough, an electrical igniter for the burner, and a control system including the following parts all located wholly within the high temperature region nearby said burner and compactly related therewith as a unit, a thermostatic element movable under the influence of heat, supporting means, movable means mounted on said supporting means so as to be movable with respect thereto and in frictional contact therewith, means connecting the thermostatic element with said movable means so as to move the same against the frictional forces exerted by said supporting means, contact means in series with said electrically operated means for directly controlling the same to admit flow of fuel upon initial movement of said movable means and for reducing feed of fuel to said burner upon reversal of direction of movement of said movable means with respect to the direction of its initial movement, and additional contact means for directly controlling said igniter to deenergize the same shortly after the initial movement of said movable means and to reenergize the igniter upon substantial reversal in direction of the movable means and travel in the reverse direction of the movable means to a degree greater than that requird to reduce the feed of fuel, said contact means and said additional contact means being mechanically connected to said movable member so as to be depending on its movement to effectuate their respective contact controlling operations.

6. In a heating system, a burner, an igniter for the burner situated to ignite the burner, an expansible and contractable thermal element subject to the heat from the burner, first and second lost-motion connections directly associated with said element, said lost-motion connections including means that tend to relieve the stress that is set up in said element due to motion thereof resulting from expansion, the first connection being adjusted to slip more readily than the second and including means for limiting the motion and thereby limit its extent of slippage, the second connection being arranged to relieve the stress beyond the limit of the slippage of the first connection, means for controlling the fuel feed to said burner in accordance with the direction of motion of the first connection, and means controlling said igniter in accordance with the direction of motion of the second connection.

7. In a heating system, an elongated burner having a plurality of ports with adjacent ports positioned close enough together as to normally ignite each other but under abnormal conditions all of the ports do not always ignite from the others, an igniter situated at one end of said burner, a valve controlling feed of fuel to said burner, a thermal element situated at the end of said burner opposite said igniter and operatively related to said valve and including means for opening the valve when the thermal element is heated and for closing the valve when the thermal element is cooled, and means which during the starting period of the heating system supplies heat to said thermal element for a limited period only, whereby if the burner does not ignite at all of its ports between said igniter and thermal element the valve will be closed upon expiration of said limited period.

8. In a heating system, a burner, an igniter for the burner, an electrical circuit controlling said igniter, a thermostatic control comprising a single expansible and contractable driving member responsive to heat from the burner and a mass which cooperates with said member and is driven by one end of said member, said thermostatic control including means whereby the movement of said mass is an unbiased slipping movement so the mass will move with respect to the other end of the member and will remain in the position where the member ceased to exert a force on the same, and means operated by the thermostatic control for controlling the admission of fuel to said burner and the energization of said circuit, the last-named means including means for admitting fuel upon initiation of driving force on said mass by said member due to heating of the member and subsequently deenergizing said igniter upon movement of said mass due to heating of said member and for preventing fuel flow when the member begins to cool and thereby ceases to exert a force on said mass in the direction of the initial force and subsequently reenergizing said igniter upon motion of said mass in the reverse direction from its initial movement, and heating means for initially heating said member to effectuate the initial force.

9. The system called for by claim 8 in which the heating means is electrically operated and is connected to said circuit to thereby be operated concurrently with said igniter, said heating means being sufficiently large that it supplies enough heat to said member so that upon cooling of the burner after accidental extinguishment of the flame the heating means will heat the member sufficiently to exert force on said mass and reestablish fuel flow whereby to reignite the burner.

10. In a heating system, a burner, an igniter for the burner, a single thermal element responsive to heat from the burner, means associated with the thermal element to affect fuel feed to said burner and to control said igniter; said means including means to admit fuel flow to said burner upon receiving response from said thermal element indicating heating of the latter and to deenergize said igniter upon receiving further response from said thermal element indicating further heating thereof, and to reduce the feed of fuel to said burner, upon receiving response from said thermal element indicating change from rising to falling temperature thereof, before reenergization of said igniter, and for reenergizing said igniter upon further drop in temperature of said thermal element; and means for heating said thermal element initially to thereby admit fuel flow, and including means for ceasing such heating for a short interval and again heating said thermal element to again admit flow of fuel if ignition does not take place on the first effort.

11. The combination with a control system including first and second devices to be controlled the first of which is to be controlled by operating between first and second positions, of a timing device for operating said devices comprising, thermally actuated means which operates upon change in temperature to move in a first direction and thereby move the first device from its first to its second position, heating means for heating said thermally actuated means, means whereby upon said first device reaching its second position further motion of the thermally actuated means will result in deenergization of said heating means, and means cooperating with the thermally actuated means whereby upon deenergization of said heating means the thermally actuated means will cool and move the first device from its second to its first position before it reenergizes said heating means, the heating means being so constructed and connected as to be reenergized when said thermally actuated means has cooled further whereupon the thermally actuated means is again heated to re-move said first device from its first to its second position, said control system having its second device connected to and operated concurrently with said heating means.

12. The combination with a burner of the control system and timing device of claim 11 in which the said first device mentioned in claim 11 is the valve for the burner which valve is closed when the device is in its said first position and the valve is open when the device is in its said second position; and in which the second device is to be controlled as mentioned in claim 11 is an electrical igniter for the burner.

13. In a heating system, a burner, an igniter for the burner, a reference member, a mass arranged to move relative said reference member and restrained from motion with respect thereto principally by friction, means cooperating with the mass and as a result of such cooperation to control the admission of fuel to said burner and the energization of said igniter, said means including an expansible and contractable thermal element for moving said mass relative to said reference member to relative positions depending on the temperature of the thermal element, said thermal element being positioned responsive to heat from said burner, said first-named means also including means for initiating fuel flow to said burner when said thermal element begins to exert a force due to expansion thereof upon the mass to tend to move the same and for subsequently deenergizing said igniter upon substantial motion of said mass relative to its reference member and after long and continued operation of the system should the flame become accidentally extinguished to first prevent further fuel flow in response to change in the direction from expansion to contraction of said element and to reenergize the igniter only after substantial movement of said mass relative said reference member due to contraction of said element, and means for initially heating said thermal element to start generation of heat by the system.

14. A heating system comprising, a first device constituting a supporting means, a second device adjacent the first device and comprising an expansible and contractable member the first end of which is carried by said supporting means, a third device adjacent said second device and constituting a fuel controller operated by the second end of said member when the member moves, a fourth device adjacent said third device and including restraining means for offering resistance to motion of said fuel controller after movement of the fuel controller by said member due to heating of the member, and a fifth device for supporting said fourth device, two of said adjacent devices being mounted relative to each other so that these two devices will slide unbiased with respect to each other to relieve stress set up in the devices due to forces therebetween resulting from heating of said member, a burner in heat transfer relationship with said expansible and contractible member, a fuel feed line to said burner, means associated with said fuel feed line for affecting the flow of fuel therethrough, the last-named means including said fuel controller for operating the same to admit fuel when said fuel controller is operated by said member due to heating thereof and to prevent fuel from flowing when said fuel controller is operated by said member in response to cooling of the latter, an electrical igniter for the burner, and contact means cooperating with the said two devices that slide with respect to each other for controlling said igniter by deenergizing the latter in response to sliding initiated by heating of said member and for reenergizing said igniter in response to sliding in the opposite direction initiated by cooling of said member; the heating system including means for heating said member initially whereby to start the system.

15. In a heating system, a burner, an igniter for the burner, heat sensitive means responsive to heat from the burner and including an elongated driving element having first and second ends that move with respect to each other when said heat sensitive means is heated and when it is cooled, a first device which supports the first end of said element, a second device which offers resistance to the second end of said element after said second end has moved a short distance as result of heating of said heat sensitive means, one of said devices being a slidable device movable, and restrained by friction so it will slide unbiased when said element continues to move due to heating, whereby the sliding will relieve forces set up in said device and enable quick reversal of the motion of the second end of said element with respect to said second device upon change from heating to cooling of said burner, fuel controlling means operated by the relative motion of said second end with respect to said second device to admit fuel when said second end is exerting force on said second device and preventing said flow when said second end ceases to exert a force on said second device, and means controlling said igniter comprising contacts operated by said sliding device to deenergize the igniter as result of substantial sliding of the sliding device due to heating thereof and reenergize said igniter in response to sliding of the sliding device in the reverse direction; the system including means to initially heat said heat-sensitive means whereby to start the system.

16. In a heating system, an elongated burner in which there are a plurality of openings to constitute jets of flame which normally ignite the entire burner when it is ignited at one point only, means for igniting a limited portion of said burner only including an igniter of limited size, and means for admitting normal fuel flow for a short interval only and then reducing fuel flow for a short interval only and then again admitting normal fuel flow for a short interval only.

17. In a heating system, a burner, an igniter for the burner, a valve, and a control system comprising the following elements all located in close proximity with the burner and all subject to the high temperature conditions thereof, an expansible and contractable member one end of which moves under influence of heat to open said valve and moves under influence of cooling to close the valve, a sliding element connected to said member and arranged to slip unbiased and relieve the stress set up in said member due to expansion thereof, and contact means associated with the sliding member to control the energization of said igniter to deenergize the same when sliding begins and to reenergize the same in response to sliding in the reverse direction.

18. In a heating system, a burner, heating means including an igniter for the burner, an electrical valve controlling fuel feed to said burner, and a control system comprising the following parts all located wholly within the high temperature region nearby said burner and subject to heat therefrom, a sliding member, a thermal element for driving said member in opposite directions respectively in response to heating and cooling of the member, said heating means operating in its entirety simultaneously with said igniter portion thereof and disposed to heat said thermal element, and pairs of contacts respectively operated by the thermal element and the sliding member for respectively controlling said valve and igniter.

19. In a heating system, a burner, a fuel controller for admitting and reducing fuel flow to the burner, a sliding member which may slide unbiased, a thermal element initially out of engagement with said member but which moves into engagement therewith when heated, said thermal element being positioned nearby the burner, additional means for initially heating said element, means for operating said fuel controller to admit fuel when said element moves into engagement with said member, and overheating-responsive means for operating the fuel controller to reduce fuel flow in event said member moves in excess of a predetermined amount.

20. In a heating system, a fixed burner, an igniter for the burner, fuel control means for the burner, a thermal element responsive to heat from the burner, means responsive to the direction of motion of said element for controlling said fuel control means, and means responsive to the relative position of the thermal element with respect to a fixed reference point for controlling the energization of said igniter.

21. In a heating system, a burner, a fuel controller for the burner, a first member, a sliding member frictionally in contact with the first member which may slide with respect thereto when a force is exerted on the sliding member, thermal force producing means responsive to combustion at said burner which produces a force on the sliding member in a first direction when heated, said thermal force producing means including means to position the same such that initial movement thereof due to force produced as a result of heating will not move said sliding member and that substantial movement of said thermal force producing means due to heating thereof following substantial initial movement will move said sliding member with respect to said first member, overheat-responsive means to operate said fuel controller to reduce fuel flow when said sliding member moves a predetermined amount with respect to said first member in said first direction, means for operating said fuel controller to admit fuel when said thermal force producing means is exerting a force on said sliding member in said first direction, and means for initially heating said thermal force producing means to a sufficient degree to exert a force on said sliding member to start flow of fuel.

WILLIAM D. HALL.